United States Patent [19]

Dianetti et al.

[11] 4,244,634
[45] Jan. 13, 1981

[54] ATTACHMENT FOR CONNECTING A PLURALITY OF INDEPENDENT MICROSCOPES

[75] Inventors: Joseph C. Dianetti, E. Aurora; Robert W. Leonard, Williamsville, both of N.Y.

[73] Assignee: American Optical Corporation, Southbridge, Mass.

[21] Appl. No.: 94,030

[22] Filed: Nov. 9, 1979

[51] Int. Cl.³ .................... G02B 21/18; G02B 23/04
[52] U.S. Cl. ........................ 350/31; 350/54; 350/174
[58] Field of Search ................. 350/30–36, 350/48, 50, 173, 54, 174; 356/390

[56] References Cited

U.S. PATENT DOCUMENTS

| 2,669,902 | 2/1954 | Barnes | 350/174 |
| 3,418,034 | 12/1968 | Ambrose | 350/36 |
| 3,450,486 | 6/1969 | Chitayat | 350/35 |

Primary Examiner—Jon W. Henry
Attorney, Agent, or Firm—Alan H. Spencer

[57] ABSTRACT

An attachment for connecting independent microscopes to permit the object under inspection in one microscope to be simultaneously viewable through other microscopes is disclosed. Optical systems are described for connecting two or three microscopes in a manner which permits an object on the stage of any of the microscopes to be viewed in all of the microscopes or selectively viewable only in the microscope having the object.

8 Claims, 2 Drawing Figures

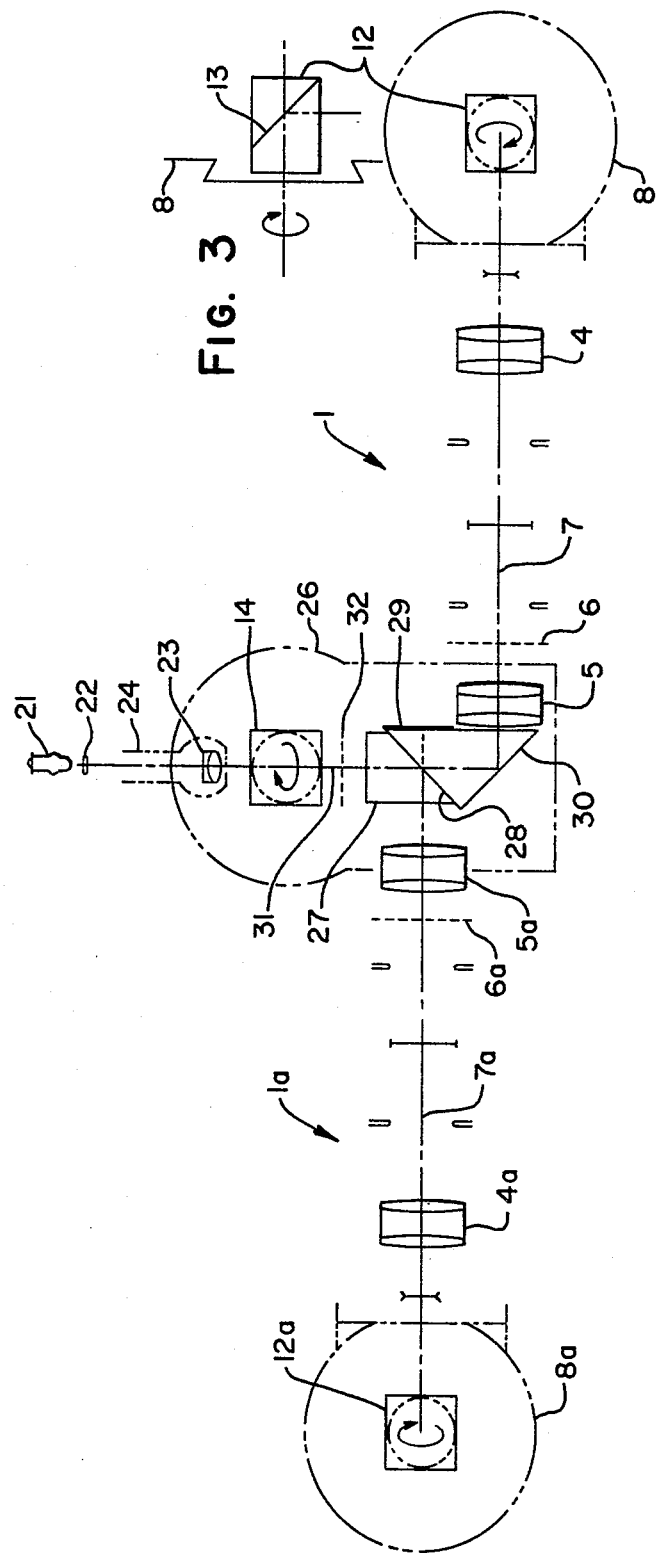

4,244,634

1

ATTACHMENT FOR CONNECTING A PLURALITY OF INDEPENDENT MICROSCOPES

BACKGROUND OF THE INVENTION

This invention relates to a system for connecting independent microscopes and more particularly a system which permits the microscopes to be used independently, or in the alternative, to permit an object on the stage of one to be viewed through the eyepiece of each microscope.

Multi-viewing attachments for microscope attachments which permit two or more people to view the same object are known. For example, American Optical Corporation has sold attachments which enable a single microscope to be used to simultaneously present an image to as many as ten individuals. Such attachments comprised a beam splitter placed on the observation axis of a single microscope, one or more relay lens systems, a mirror in a support for each relay system and one or more binocular or binocular bodies connected to each support. This arrangement works by diverting light to the remote viewing stations using the beam splitter in the microscope.

BRIEF DESCRIPTION OF THE PRESENT INVENTION AND DRAWINGS

According to the present invention a plurality of microscopes may be connected by an attachment having a beam splitter for each microscope and a relay lens system for connecting the beam splitters. In the preferred embodiment, the beam splitter of each microscope is rotatable 180° in order that an object on the stage of any microscope may be presented for viewing at the viewing body eyepiece or eyepieces of any of the other microscopes connected by the attachment, as well as viewable through the eyepiece or eyepieces of the microscope having the object being examined. An occluder selectively positionable in each relay permits totally independent use of each microscope when it is so desired.

FIG. 1 is a front schematic diagram of an embodiment of the present invention for connecting two independent microscopes; and FIG. 2 is a top schematic diagram of an embodiment of the present invention for connecting three independent microscopes.

DESCRIPTION OF THE PREFERRED EMBODIMENTS

Figure 1:
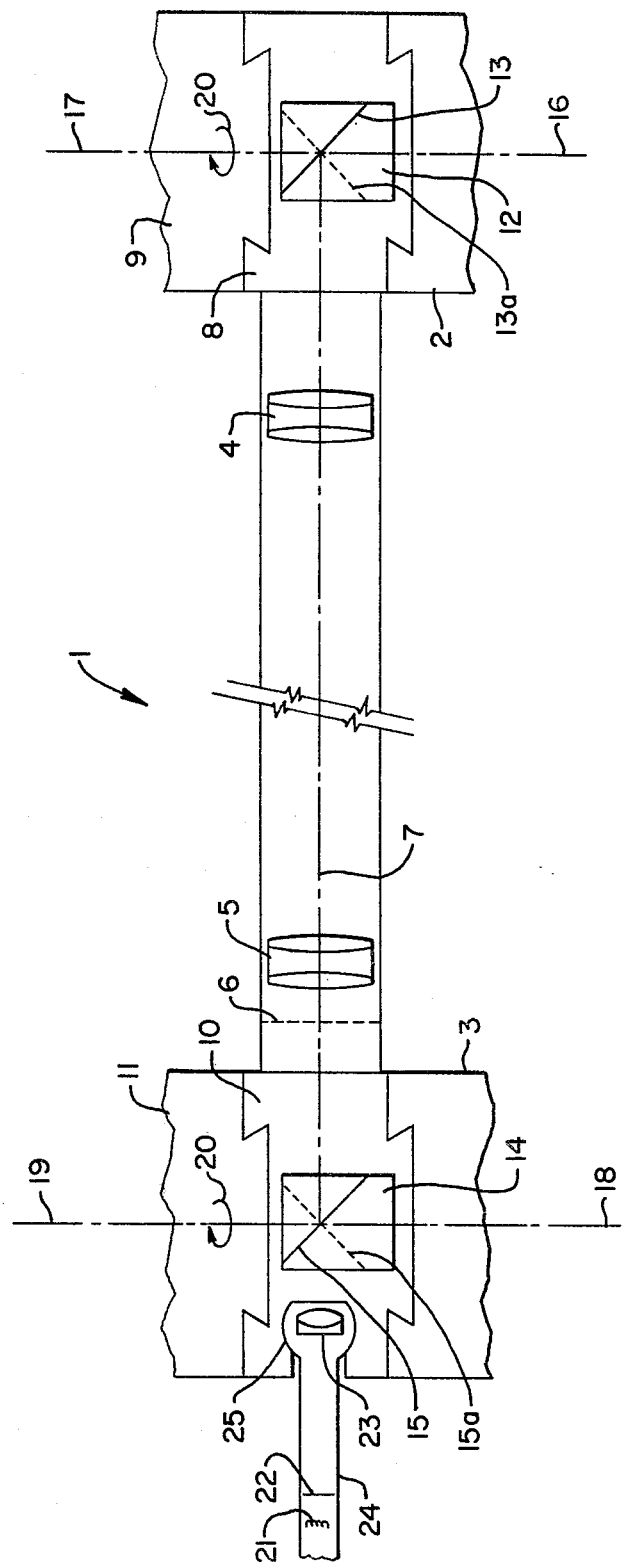

Referring to FIG. 1, a relay system generally indicated by the numeral 1 connects microscope stands (shown in part) 2 and 3. Relay system 1 includes relay lenses 4 and 5 and occluder 6 which is selectively positionable on relay optical axis 7 to prevent light completing passage along relay system 1. Relay support 8 is positioned between microscope stand 2 and viewing body 9 (shown in part). Similarly, relay support 10 is positioned between microscope stand 3 and viewing body 11 (shown in part). Relay support 8 carries beam splitter 12 which has partially transmissive-partially reflective surface 13. Similarly, relay support 10 carries beam splitter 14 which has partially transmissive-partially reflective surface 15.

Still referring to FIG. 1, light from an object (not shown) on the stage of microscope stand 2 passes along microscope axis 16 to surface 13. Part of the light is transmitted through surface 13 along observation axis 17 through viewing body 9 to the microscope eyepiece (not shown). When occluder 6 is in place, no light reflected by surface 13 reaches beam splitter 14. Similarly, light from an object (not shown) on the stage of microscope stand 3 passes along microscope axis 18 to surface 15. Part of the light is transmitted through surface 15 along observation axis 18 through viewing body 11 to the eyepiece (not shown). When occluder 6 is removed from its position on relay optical axis 7 and the object on the stage of microscope stand 3 is not illuminated, light reflected by surface 13 is relayed by lenses 4 and 5 and partially reflected by surface 15 along observation axis 19. This arrangement permits the same object to be simultaneously viewed in viewing body 9 along observation axis 17 and in viewing body 11 along observation axis 19.

An object located on the stage of microscope stand 3 may be simultaneously viewed in both bodies 9 and 11. To accomplish this, the illumination is provided to the object on the stage of microscope stand 3, while none is provided on the stage of microscope stand 2. In addition, beam splitters 12 and 14 are each rotated 180° as indicated by arrows 20 to position surfaces 13 and 15 in the locations indicated by dotted lines 13a and 15a, respectively. Light traveling along microscope axis 18 is now partially transmitted by surface 15 along observation axis 19 and partially reflected by surface 15 along relay optical axis 7 through relay lenses 5 and 4 and partially reflected by surface 13 along observation axis 17.

The attachment permits three modes of operation. In the first mode, the two microscopes are operated independently. In the second mode, an object on the stage of one microscope may be viewed in the eyepieces of both. In the third mode, an object on the stage of the other microscope can be viewed in the eyepieces of both.

It is frequently desirable when more than one individual is observing an object to be able to indicate a specific portion of the field. A convenient means of accomplishing and selectively indicating a portion of the field is provided by illumination from source 21 on a reticle 22 which is imaged by lens 23. Surface 15 reflects some light passed by reticle 22 along observation axis 19 and transmits some light along relay optical axis 7 to observation axis 17 in order that both observers can observe the same specific portion of the field under consideration. Reticle 22 may conveniently present an image of an arrowhead which may be selectively positioned in the field by moving handle 24 which extends from ball socket 25 in relay support 10. A similar pointer may be used in conjunction with relay support 8.

Referring to FIG. 2, the relay systems for connecting three microscopes are indicated generally by 1 and 1a. Components which are identical to components shown in FIG. 1 are identified by the same number. Furthermore, since relay 1a is the same as relay 1 and relay support 8a is the same as relay support 8, the optical components for the microscope on the left have been identified with an "a" in addition to having the numeral of the equivalent component on the right-hand side. Since the relays and supports 8 and 8a are identical to those discussed in FIG. 1, they will be described only in connection with their function in transporting images from each of the respective stages to the respective microscope viewing bodies. Central relay support 26 supports additional beam splitter 27 as well as beam splitter 14. Beam splitter 27 has partially transmissive-partially reflective surface 28 and totally reflective surfaces 29 and 30.

Beam splitter 27 permits an object below relay supports 26, 8 or 8a to be selectively viewed simultaneously through the viewing body on all of the supports. When the object to be viewed is on the stage below central relay support 26, a portion of the light is deflected by beam splitter 14 along axis 31 and is again split by surface 28 of beam splitter 27. The portion transmitted by surface 28 passes along axis 33 until it is reflected by totally reflective surface 29 along relay optical axis 7 to the viewing body above relay support 8. The portion deflected by surface 28 is relayed along relay optical axis 7a for viewing by the viewing body above relay support 8a.

When the object to be viewed is below relay support 8, the light deflected by beam splitter 12 passes along relay optical axis 7, is deflected by totally reflective surface 30 along axis 33 and the portion transmitted by surface 28 is partially deflected by beam splitter 14 to the viewing body above central relay support 26. The portion deflected by surface 28 is reflected from totally reflective surface 29 and the portion of that transmitted by surface 28 passes along relay optical axis 7a and is partially deflected by beam splitter 12a to the viewing body positioned above relay support 8a.

When the object to be used is on the stage below relay support 8a, light deflected by beam splitter 12a passes along relay optical axis 7a toward beam splitter 27. The portion initially deflected by surface 28 is partially deflected by beam splitter 14 to the viewing body above central relay support 26. The portion initially transmitted by surface 28 is reflected by totally reflective surface 29 and partially deflected by surface 28 to totally reflective surface 30 where it is deflected to pass along relay optical axis 7 and is partially deflected by beam splitter 12 to the viewing body above relay support 8.

Each of beam splitters 12, 12a and 14 are identical and preferably rotatable 180° as shown in FIG. 1. Occluder 6, 6a and 32 may be independently and selectively positioned on the respective axis in order to permit each microscope to be used independently of the attachment joining it to the others.

What is claimed is:

1. An attachment for optically coupling two microscopes, each microscope having a stand and a detachable viewing body, which comprises two relay supports, each support being adapted for mounting between a stand and viewing body, an optical relay connecting said supports, beam splitting means mounted in each support for coupling said relay to each microscope, whereby one stand is coupled to two viewing bodies by the relay.

2. The attachment according to claim 1 wherein an occluder is selectively positionable in said relay to isolate the microscopes.

3. The attachment according to claim 1 wherein each means is mounted for rotation in order that either stand may be selectively coupled to said viewing bodies.

4. The attachment according to claim 3 wherein said means is rotatable 180°.

5. The attachment according to claim 1 further including an additional support and beam splitting means and an additional optical relay connecting said addition support to one of said two optical relays for coupling a third microscope.

6. The attachment according to claim 5 wherein one support contains additional beam splitting means for coupling said relay to said additional relay.

7. The attachment according to claim 6 wherein said relay and said additional relay are optically equivalent.

8. The attachment according to claim 7 further including an occluder selectively positionable in each of said relay, said additional relay and said one support to isolate said microscopes.

* * * * *